United States Patent [19]

Fondeur

[11] Patent Number: 4,886,353
[45] Date of Patent: Dec. 12, 1989

[54] MEASURING DEVICE EMPLOYING LASER INTERFEROMETRY

[75] Inventor: Bernard Fondeur, Coye-La-Foret, France

[73] Assignee: D.E.A. Digital Electronic Automation S.p.A., Moncalieri, Italy

[21] Appl. No.: 169,416

[22] Filed: Mar. 17, 1988

[30] Foreign Application Priority Data

Mar. 17, 1987 [FR] France ............................... 87 03640

[51] Int. Cl.$^4$ .............................................. G01B 9/02
[52] U.S. Cl. .................................... 356/4.5; 356/358; 356/363
[58] Field of Search ....................................... 356/4–5, 356/358, 363; 250/203 R

[56] References Cited

U.S. PATENT DOCUMENTS 4,053,231 10/1977 Fletcher .
4,349,732 9/1982 Whitby et al. .............. 250/203 R X
4,707,129 11/1987 Hashimoto et al. ................. 356/4.5
4,714,339 12/1987 Lau et al. .............................. 356/4.5

FOREIGN PATENT DOCUMENTS 1513249 6/1978 United Kingdom .
1549852 8/1979 United Kingdom .

Primary Examiner—Davis L. Willis
Assistant Examiner—Matthew W. Koren
Attorney, Agent, or Firm—Gifford, Groh, Sheridan, Sprinkle and Dolgorukov

[57] ABSTRACT

A measuring device employing laser interferometry, and featuring a device for tracking a mobile target; which tracking device is located between a light source and a semireflecting mirror, for the purpose of eliminating any inaccuracy due to the construction of the aforementioned measuring device.

9 Claims, 2 Drawing Sheets

MEASURING DEVICE EMPLOYING LASER INTERFEROMETRY

BACKGROUND OF THE INVENTION

The present invention relates to a measuring device employing laser interferometry, and which provides for determining the displacement of a reflector within a given working cone, by virtue of a reflector tracking system designed to eliminate any error in measurement.

Interferometry, particularly laser interferometry, consists in determining the interference fringes produced by the increase in length of a light beam in relation to a reference beam; both beams being generated by the same source, and being divided by a separator (plate, semireflecting mirror, polarizing prism, Nicol prism . . . ), after which, they are reflected by a fixed and mobile reflector respectively on to the said separator where they are re-united. When the mobile reflector is moved, the reunited reflected beam presents interference, which is counted by means of a cell; each fringe corresponding to a half wavelength of light in air (approximately 0.3 $\mu$m on standard lasers employed in applications of this sort).

One of the major drawbacks of equipment of this type consists in obtaining the reflected beam from the mobile reflector. Reflectors are known to consist of concave right-angle mirrors, which send back a reflected beam parallel with the incident beam and symmetrical in relation to their edges. For measuring or controlling displacement of the reflector, the displacement direction must therefore be known, and the equipment set up accordingly for ensuring interception of the beams directed on to the mobile reflector, and the formation of a useful reflected beam.

In certain applications, for measuring the distance between two points on a structure, the target (mobile right-angle reflector) is mounted on a support which can be moved from one point to another on the test structure. As the said support is moved manually, the mobile reflector is mounted on a device which moves it, in relation to the support, in a plane perpendicular to the said manual displacement, so as to maintain the return beam from the mobile reflector within a given area enabling it to be reunited with the return beam from the fixed reflector. The said device for displacing the mobile reflector is connected to a cell for ensuring maximum illumination. In addition to being limited to special measuring applications, the said device also involves a certain amount of inaccuracy, due to inevitable, poorly controlled slack between the mobile reflector and support.

A basic interferometric cell is therefore required for tracking the path of the mobile reflector within given limits. A number of cells assigned to one or more mobile reflectors, mounted on freely displaceable measuring supports of lightweight, low-cost design, therefore provide for achieving at least the same measuring accuracy as much larger climatized machines currently available on the market.

SUMMARY OF THE INVENTION

With this aim in view, according to the present invention, there is provided an interferometric measuring cell or device on which a mobile reflector tracking device is located on the beam path upstream from the separator, i.e. in an area of the device wherein the beam is as yet undivided or already reunited, thus eliminating any intervention on the beam paths being compared and, consequently, any inaccuracy in the length of the same; which inaccuracy is inevitable using optical assemblies or mobile mirrors on the beam, due to the imprecision of the mechanical assemblies involved.

The said tracking device comprises appropriate beam deflecting means, e.g. powered mirrors, acoustic-optical deflectors, orientable source, etc., connected in such a manner that the beams reflected by each reflector are reunited at least partially, i.e. intersect, on the said separator. This requirement is met quite simply by ensuring that at least the beam reflected by the mobile reflector travels through a given area in the vicinity of the symmetrical image of the fixed reflector in relation to the separating surface.

In a first embodiment, drive members operate directly on the light source and receiver; the said receiver being located in a fixed position in relation to the separator, and close enough to the same to fall within an area wherein the beam is reunited at least partially.

In a second embodiment, the light source and receiver are fixed, and the tracking device consists of an optical assembly connected to the drive members.

The said optical assembly comprises at least a mirror, the setting and location of which between the source and interferometric mirror are controlled by drive motors. The said given area through which the reflected beam from the mobile reflector travels consists of a four-part optoelectric cell supplying control output signals.

The said tracking device may also comprise a second cell for controlling the said drive member/s and located at a given point along the reflected beam from the fixed reflector.

BRIEF DESCRIPTION OF THE DRAWINGS

The present invention will be described, by way of nonlimiting examples, with reference to the accompanying drawings, in which.

DESCRIPTION OF THE INVENTION

Figure 1:
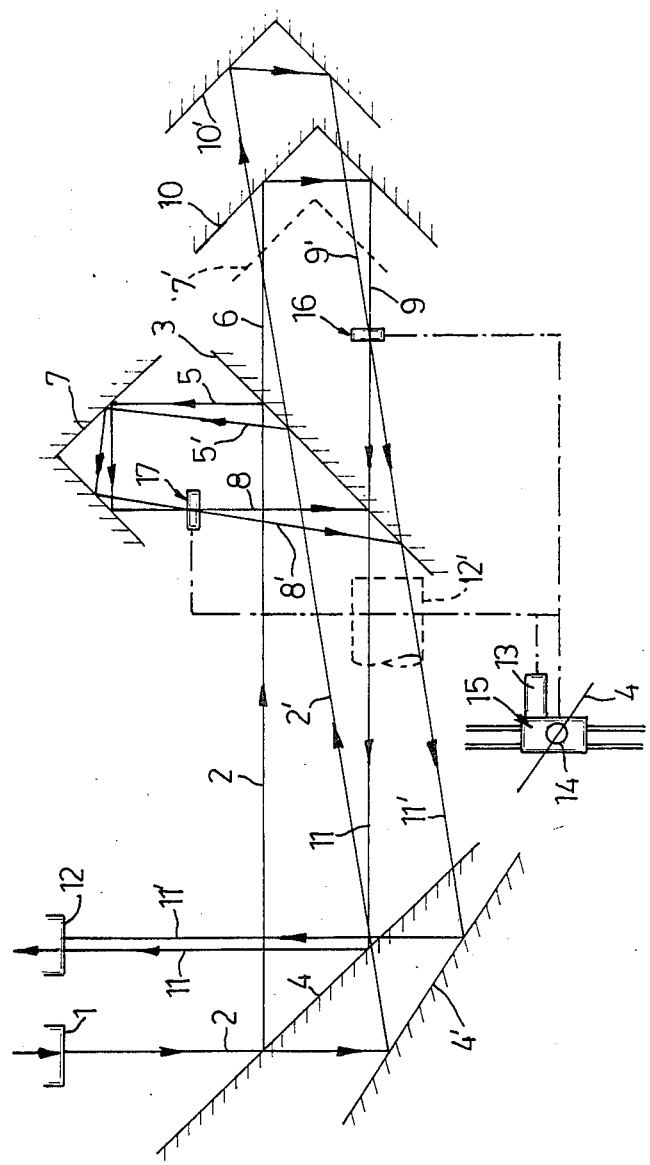
FIG. 1 shows an operating diagram of the tracking device on the device according to the present invention.

Number 1 in FIG. 1 indicates a laser source (e.g. a Melium Neon laser) designed to emit a beam 2 on to a separator or interferometric mirror 3. In FIG. 1, the said beam 2 is deflected by means of a mirror, but it may also be emitted directly on to the said mirror 3.

The said mirror 3 divides beam 2 into a reflected beam 5 and a through beam 6. The said reflected beam 5 is sent back, parallel with itself, on to mirror 3 by means of a fixed right-angle reflector 7, the resulting return beam 8 reuniting with return beam 9 of beam 6, sent back by a mobile right-angle reflector 10. The reunited beam 11 is reflected by mirror 4 towards a cell 12 designed to count the interference fringes in beam 11 when mobile reflector 10 is moved.

As shown clearly in FIG. 1, a measurement can only be made providing reflector 10 moves parallel with beams 2 and 11. As the average diameter of the said beams is in the region of 6 millimeters, however, a slight deviation above or below this ideal line is tolerable providing return beam 9 encounters beam 8 on mirror 3. When mobile reflector 10 is moved, for example, into position 10', i.e. in a non-parallel direction in relation to beams 2 and 11, beam 6 is reflected along path 9' and is no longer reunited, even partially, with return beam 8 from fixed reflector 7, thus making measurement impossible.

To overcome this drawback, provision is made between source 1 and receiver 12 (in FIG. 1) for a target (mobile reflector 10) tracking device whereby, regardless of the position 10' of target 10 within a given range in relation to the ideal position 10, return beam 9, 9' travels through a given fixed point in the vicinity of image 7' of fixed reflector 7 in relation to mirror 3, and preferably located between the said mirror 3 and the said image 7'. The said fixed point consists, for example, of the center of a four-element optoelectric cell 16 as shown schematically in FIGS. 4 and 5. The FIG. 4 elements are in the form of probes 40, 41, 42 and 43, which penetrate beam 9, 9' perpendicularly to one another and in a plane perpendicular to the said beam. Any displacement of the beam in relation to a neutral position, wherein the probes are illuminated and supply an identical output signal, unbalances the said output signals; which unbalance is amplified and identified to produce a control signal for activating tracking device control motors and so restoring balance.

Figure 5:
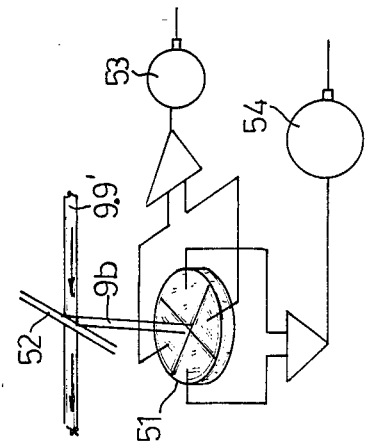
FIGS. 4 and 5 show schematic views of cell mechanisms for controlling the said drive members.
Figure 4:
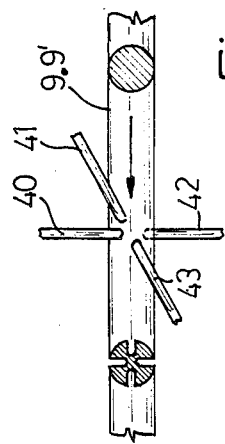

Unlike the FIG. 4 device, which is located along the return beam path, the FIG. 5 device comprises a four-part cell 51 illuminated by branch 9b of beam 9, 9' deflected by a semitransparent mirror 52. As in the foregoing case, any unbalance of cell 51 is exploited for activating control motors 53 and 54.

As shown schematically by 13 and 14 in FIG. 1, the said motors may be integral with a carriage 15 supporting mirror 4; the said motors 13 and 14 enabling rotation and travel of mirror 4 into position 4' in response to displacement of mobile reflector 10 into position 10'. Detector 16 may be either of the types shown in FIGS. 4 and 5.

A second detector 17, of either of the aforementioned types, may be provided on return beam 8, 8' of beam 5, 5' reflected by fixed reflector 7. The signals from each of the said detectors 16 and 17 may be supplied to a control unit featuring a signal interpreting program for accordingly activating the device control motors.

The FIG. 1 embodiment is purposely limited to one plane. In actual use, however, the tracking system must be provided with additional degrees of freedom, which means a larger number of motors may be employed.

Figure 2:
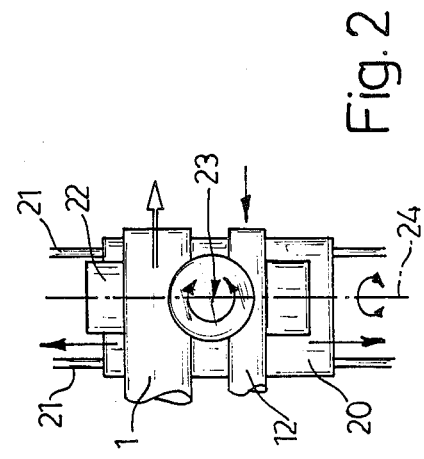
FIG. 2 shows the said tracking device employed for controlling the light source.

FIG. 2 shows a schematic embodiment wherein the tracking device is connected directly to coherent light source 1 and cell 12, though the after may be independently located in position 12' (FIG. 1). A carriage 20 traveling along a rail 21 supports a turret 22 designed to turn about an axis 24 parallel with rail 21, and to travel along and turn about an axis 23 perpendicular to axis 24. Elements 1 and 12 are mounted on this support.

Figure 3:
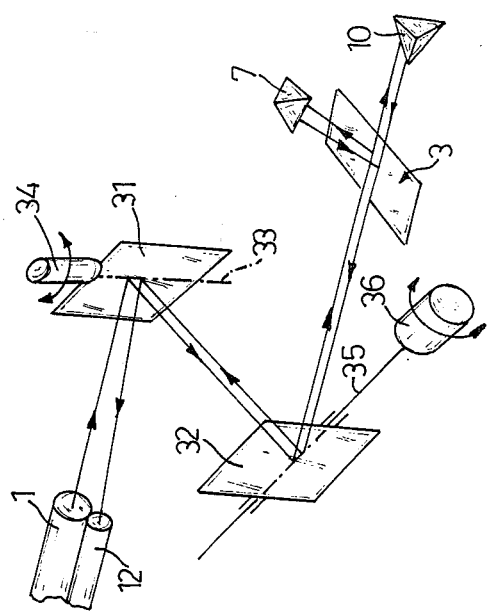
FIG. 3 shows an embodiment of the said tracking device featuring a number of mirrors.

The FIG. 3 tracking device comprises two mirrors 31 and 32, which are turned respectively about axes 33 and 35 by respective motors 34 and 36.

A tracking device may be provided featuring a greater number of rotary mirrors, of which two are loop-connected to a cell such as 51 in FIG. 5, whereas the others are connected in open-loop formation.

The nature of the optical assemblies employed provides for reliable operation of the tracking device within a cone having a slope of approximately 10%. That is to say, if located ten meters from the mirror, mobile reflector 10 may move one meter to either side of the ideal center line. A similar performance feature is of immense value for application of the present invention on measuring equipment. If, for example, a mobile support on a stand is fitted with a number of mobile reflectors 10 having one or more fixed basic cells such as the one shown in FIG. 1, the fixed reference coordinates of points on a workpiece may be determined for easily and accurately determining the sides of the workpiece. A number of requirements must of course be met, in particular for enabling initiation and checking or correcting any variations in measurment due to external phenomena.

A similar device, which is at least as accurate as far more sophisticated measuring equipment, is considerably more compact and, involving no solid or material references, is far easier to produce, maintain and install. The device according to the present invention is particularly suitable for use on measuring and control equipment.

I claim:

1. A measuring device employing laser interferometry and comprising at least an interferometric cell and a mobile reflector designed to move in relation to the same; said cell comprising a coherent light source emitting a source beam, an interferometric separator splitting said source beam into a first beam and a second beam, a fixed reflector for reflecting said first beam back to said separator, said mobile reflector receiving said second beam and reflecting a return beam to said separator whereby said first beam and said return beam form a reunited beam a receiver; of said required beam and a tracking device located between said interferometric separator and said source and receiver for tracking displacement of said mobile reflector by controlling the direction of said source and reunited beam, no further control being provided on said second or return beam and located upstream from said interferometric separator.

2. A device as claimed in claim 1, characterised by the fact that said tracking device comprises at least drive means, the operation of which is dependent on at least the return beam from said mobile reflector traveling through a given point in the vicinity of an image of said fixed reflector in relation to the separator.

3. A device as claimed in claim 2, characterised by the fact that said drive means operates directly on said light source.

4. A device as claimed in claim 2, characterised by the fact that the said light source is fixed, and that said tracking device includes an optical assembly connected to the said drive means.

5. A device as claimed in claim 4, characterised by the fact that said optical assembly comprises at least a mirror the setting and location of which between said light source and said separator are controlled by said drive means.

6. A device as claimed in claim 5, characterised by the fact that said optical assembly comprised at least two separate mirrors controlled so as to turn about two axes perpendicular to each other and to said return beam.

7. A device as claimed in claim 2, characterised by the fact that said given point through which said return beam reflected by said mobile reflector travels consists of an optoelectric cell the output signal of which constitutes the control signal of said drive means.

8. A device as claimed in claim 2, characterised by the fact that said given point is located between said image of said fixed reflector and said interferometric separator.

9. A device as claimed in claim 2, characterised by the fact that it comprises a second cell for controlling said drive means located at a given point along the path of the beam reflected by said fixed reflector.

* * * * *